United States Patent
Ask et al.

(10) Patent No.: US 7,086,302 B2
(45) Date of Patent: Aug. 8, 2006

(54) APPARATUS FOR REDUCING GEAR TRAIN BACKLASH

(75) Inventors: Kenneth Ask, Västra Frölunda (SE); Elise Nielsen Höjkrogh, Göteborg (SE); Nils-Olof Håkansson, Stenkullen (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/604,782

(22) Filed: Aug. 15, 2003

(65) Prior Publication Data

US 2004/0103737 A1 Jun. 3, 2004

Related U.S. Application Data

(63) Continuation of application No. PCT/SE02/00236, filed on Feb. 11, 2002.

(30) Foreign Application Priority Data

Feb. 15, 2001 (SE) .................................. 0100496

(51) Int. Cl.
*F16H 55/18* (2006.01)
(52) U.S. Cl. .......................................... 74/409; 40/440
(58) Field of Classification Search .................. 74/409, 74/440
See application file for complete search history.

(56) References Cited

U.S. PATENT DOCUMENTS

| | | | | |
|---|---|---|---|---|
| 2,081,644 A | * | 5/1937 | Smythe ........................ 74/440 |
| 2,607,238 A | * | 8/1952 | English et al. ................. 74/440 |
| 2,640,428 A | * | 6/1953 | Houghton .................... 417/338 |
| 2,896,466 A | * | 7/1959 | Wiseman ...................... 74/440 |
| 4,072,064 A | * | 2/1978 | Lloyd et al. .................. 74/409 |
| 4,408,526 A | * | 10/1983 | Mathes ........................ 101/216 |
| 4,747,321 A | * | 5/1988 | Hannel ......................... 74/440 |
| 5,794,529 A | * | 8/1998 | Dawley et al. .............. 101/216 |
| 5,979,260 A | | 11/1999 | Long et al. ................... 74/440 |
| 6,047,608 A | * | 4/2000 | Stieler ......................... 74/409 |

FOREIGN PATENT DOCUMENTS

DE 3901076 A1 8/1989

* cited by examiner

*Primary Examiner*—William C. Joyce
(74) *Attorney, Agent, or Firm*—Novak Druce & Quigg, LLP

(57) ABSTRACT

Apparatus for reducing backlash in a gear wheel that includes at least two interacting gear rims that rotate in relation to one another. An adjusting mechanism is located between the gear rims for adjusting the relative angle of rotation of the gear rims about a common axis of rotation. Each adjusting mechanism includes an hydraulic cylinder connected to a pressure medium source and which is arranged to act between the two gear rims in such a manner that a force arises that tends to displace one gear rim in relation to the other about the axis of rotation. Each of the hydraulic cylinders extends at an angle to a disk plane and is supported on a part-spherical foot portion in a bowl-shaped seat in one gear rim and a corresponding part-spherical head portion in a bowl-shaped seat in the other gear rim.

16 Claims, 4 Drawing Sheets

US 7,086,302 B2

APPARATUS FOR REDUCING GEAR TRAIN BACKLASH

CROSS REFERENCE TO RELATED APPLICATIONS

This present application is a continuation patent application of International Application No. PCT/SE02/00236 filed 11, Feb. 2002 which was published in English pursuant to Article 21(2) of the Patent Cooperation Treaty, and which claims priority to Swedish Application No. 0100496-9 filed 15, Feb. 2001. Both applications are expressly incorporated herein by reference in their entireties.

BACKGROUND OF INVENTION

1. Technical Field

The present invention relates to an apparatus for reducing backlash in a gear wheel, which wheel comprises (includes, but is not limited to) at least two interacting gear rims that can rotate in relation to one another, and at least one adjusting means located between the gear rims for adjusting the relative angle of rotation of the gear rims about a common axis of rotation.

2. Background Art

In internal combustion engines with an overhead camshaft, use is sometimes made of a gear train for driving the camshaft. In this connection, the gear train can comprise three or more serially arranged gear wheels. As the camshaft controls the opening and closing of spring-operated valves, the camshaft is acted on by greatly varying torques during its rotation. This means that any backlash which arises in the tooth engagement normally gives rise to a high level of noise and also tooth wear.

In order to restrict backlash to a minimum, as many gear wheels as possible are mounted in the same part, for example in a common transmission plate. In engines with an overhead camshaft, however, the camshaft wheel is, of necessity, mounted in another part, the tolerance chain then being longer and the precision poorer. Although the position of, for example, an intermediate wheel can be designed so as to be adjustable, the backlash can nevertheless be unacceptably great.

An apparatus is known from U.S. Pat. No. 5,979,260, the disclosure of which is herein expressly incorporated by reference, which is intended to reduce the backlash in a gear train. This apparatus comprises a gear wheel with gear rims which are divided in the wheel plane and can be displaced in terms of rotation so that the projecting and resulting tooth width increases and fills the tooth gap. The gear wheel is equipped with powerful springs which hold the two tooth flanks apart so that the backlash is zero in at least one tooth engagement. As space is normally very limited and great forces are required, this is a very difficult construction in which, on the one hand, to find room for sufficiently strong springs, and on the other hand, because these are very rigid and tolerance-sensitive, to get all the springs to work reasonably alike and to achieve the desired precision of the forces.

SUMMARY OF INVENTION

One objective of the present invention is therefore to produce an apparatus which solves the problem of varying backlash in a more effective manner has been previously known.

The invention therefore relates to an apparatus for reducing backlash in a gear wheel, which wheel comprises at least two interacting gear rims that can rotate in relation to one another. There is at least one adjusting means located between the gear rims for adjusting the relative angle of rotation of the gear rims about a common axis of rotation. The adjusting means consists of a hydraulic cylinder connected to a pressure medium source and is arranged so as to act between two gear rims in such a manner that a force arises, which tends to displace one gear rim in relation to the other, about the axis. By virtue of this design of the apparatus, the rotational force which evens out the backlash can be applied uniformly at several points along the gear rim.

Various advantageous illustrative embodiments of the invention will emerge from the following description and associated drawings.

BRIEF DESCRIPTION OF DRAWINGS

The invention will be described in greater detail below with reference to an illustrative embodiment which is shown in the accompanying drawings, in which.

DETAILED DESCRIPTION

Figure 1:
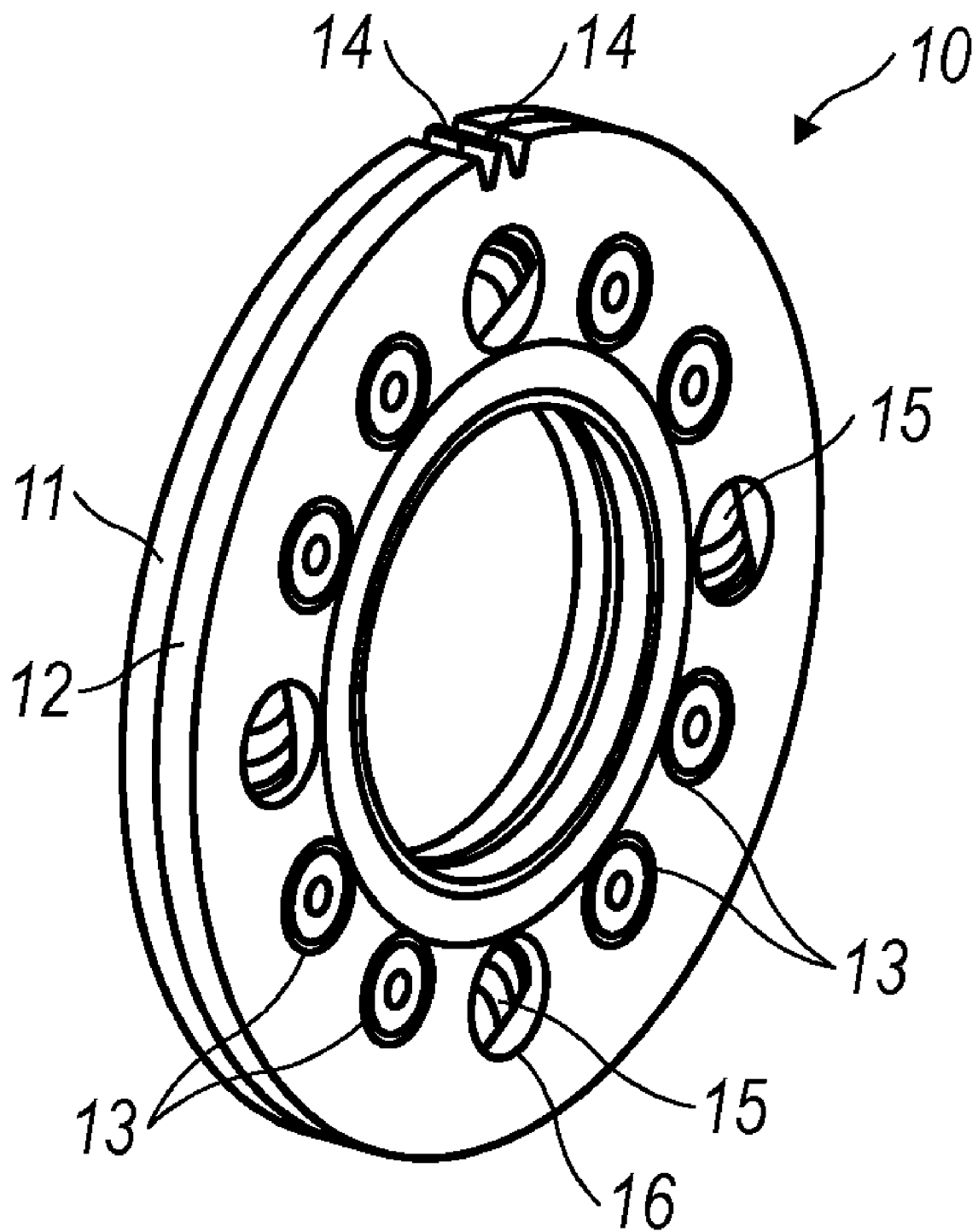
FIG. 1 is a perspective view of a gear wheel designed according to the present teachings.
Figure 2:
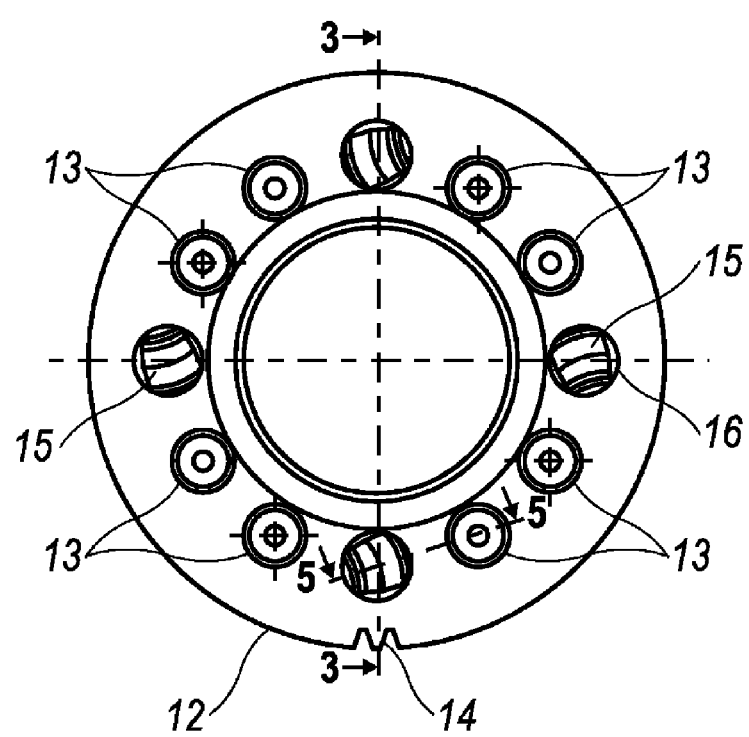
FIG. 2 is a plan view of the gear wheel shown in FIG. 1.
Figure 3:
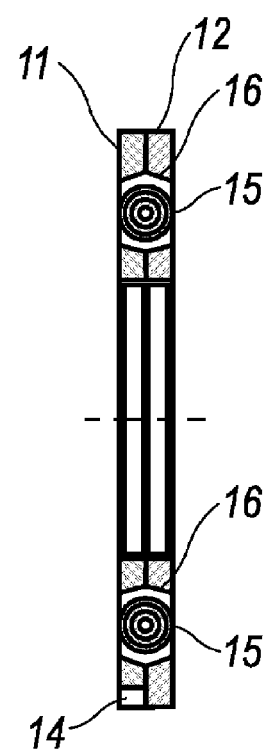
FIG. 3 is a sectional view taken along the line 3—3 in FIG. 2.
Figure 4:
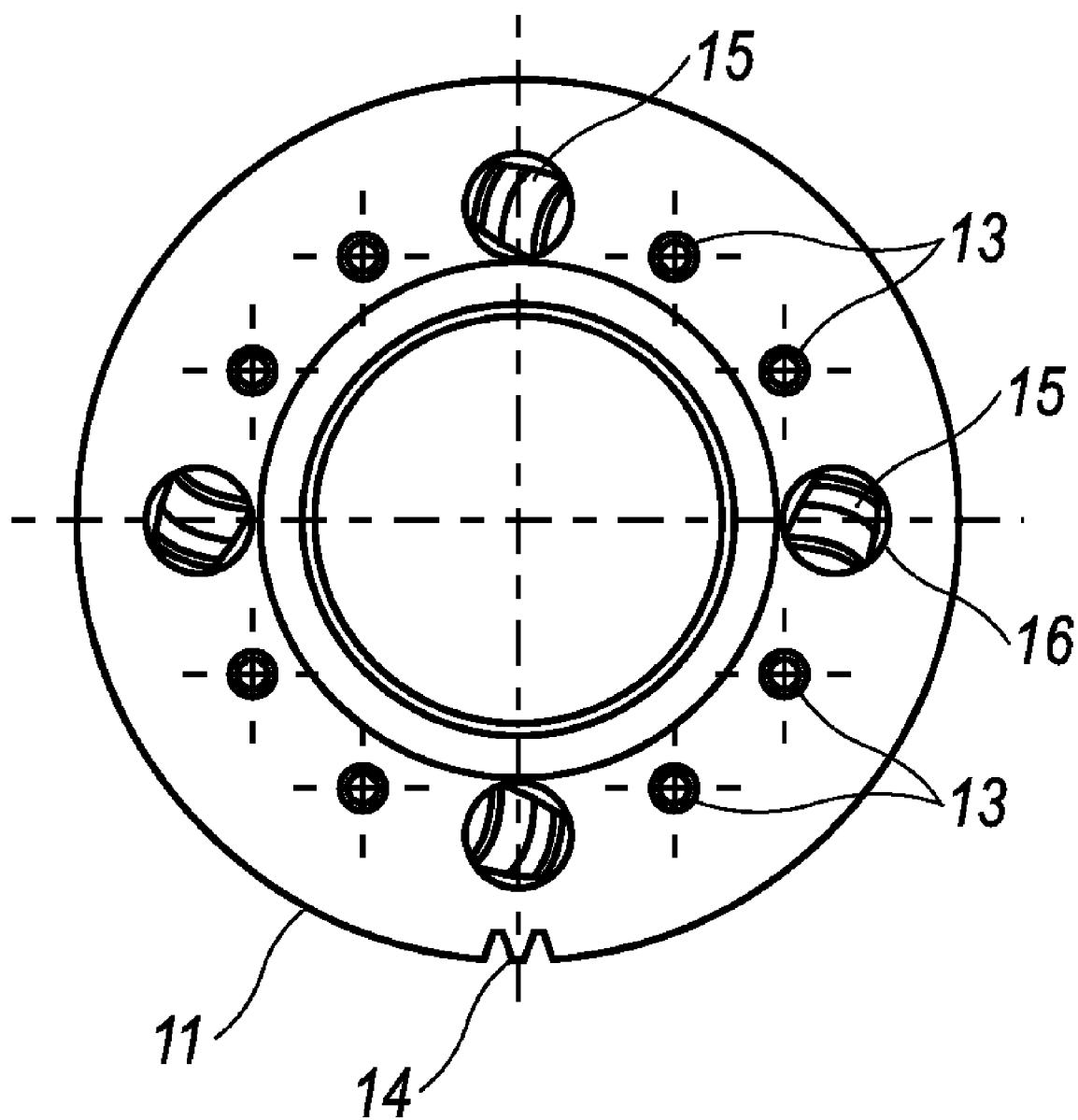
FIG. 4 shows an opposite side of the gear wheel as shown in FIG. 2.

The gear wheel 10 shown in FIGS. 1–4 comprises a first disk-shaped gear rim 11 and a second disk-shaped gear rim 12, which are interconnected by means of bolted joints 13. These bolted joints are designed in such a manner that they make possible a certain mobility in the disk plane, for example about a common axis of rotation. By virtue of this mobility, the parallel tooth pairs 14 can be relatively displaced in a scissors-like manner, so that they can, in a known manner, take up any backlash in the engagement with an interacting gear wheel which is not shown.

Figure 5:
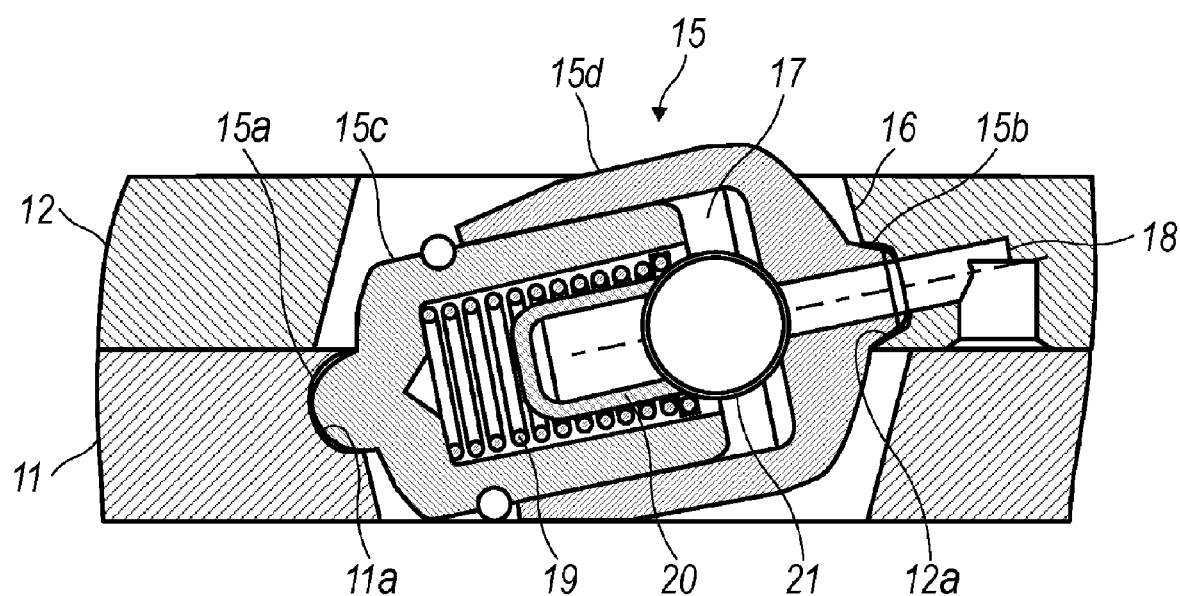
FIG. 5 is a section along the line 5—5 in FIG. 2.

The displacement of the gear rims 11, 12 is brought about by means of small hydraulic cylinders 15, which are mounted in cutouts 16 in the two gear rims. The installation of the hydraulic cylinders 15 can be appreciated from FIG. 5, which shows how a hydraulic cylinder extends at an angle to the disk plane, so that it is supported with a part-spherical foot portion 15a in a bowl-shaped seat 11a in the gear rim 11, and a corresponding part-spherical head portion 15b in a bowl-shaped seat 12a in the gear rim 12.

The hydraulic cylinder comprises an inner and an outer cylinder part 15c and 15d, respectively, which together form an inner chamber 17 which can communicate with a pressure source (not shown) via a duct 18 in the gear rim 12. The chamber 17 accommodates a compression spring 19, a guide bushing 20 for the spring and a spherical body 21, which together form a check valve against the opening of the duct 18.

The hydraulic cylinder can obtain working pressure from, for example, the oil pump of an internal combustion engine. In the illustrative embodiment shown, use is made of four hydraulic cylinders in order to generate rotational force between the two gear rims 11, 12. According to the invention, it is of course possible to use more or fewer hydraulic cylinders. The oil pressure tensions the teeth to zero backlash at low pressure when the torque transmission is zero, and the check valve prevents the oil from flowing back when the torque is applied again. The pressure on the enclosed oil then rises to the level required in order to transmit the torque. All the piston cylinders will work at the same pressure because they have all been filled to corresponding zero backlash.

The system can work according to the same principle as conventional valve clearance compensators for internal combustion engines; that is to say, with a small controlled leakage and recurrent topping-up between torque changes. This means that, in the case of, for example, a six-cylinder, four-stroke engine, the backlash is adjusted six times per camshaft revolution, as a result of which it is also possible for the system to compensate for any pitch errors in the gear transmission.

The invention is not to be regarded as being limited to the illustrative embodiments described above, but a number of further variants and modifications are possible within the scope of the following patent claims. For example, the apparatus can comprise more than two gear rims.

The invention claimed is:

1. An apparatus for reducing backlash in a gear wheel comprising:
   at least two interacting gear rims that rotate in relation to one another;
   at least one adjusting means located between the gear rims for adjusting the relative angle of rotation of the gear rims about a common axis of rotation, each of said adjusting means comprising an hydraulic cylinder connected to a pressure medium source and being arranged to act between the two gear rims in such a manner that a force arises that tends to displace one gear rim in relation to the other about the axis of rotation;
   each of the hydraulic cylinders extending at an angle to a disk plane and supported on a part-spherical foot portion in a bowl-shaped seat in one gear rim and a corresponding part-spherical head portion in a bowl-shaped seat in the other gear rim.

2. The apparatus as recited in claim 1, wherein at least two hydraulic cylinders are located with even spacing in relation to one another in a dividing plane between two gear rims.

3. The apparatus as recited in claim 2, wherein each hydraulic cylinder comprises two sleeve parts arranged telescopically, one inside the other, and one of which has a duct connected to the interior of the sleeves for supplying pressure medium.

4. The apparatus as recited in claim 3, wherein the sleeve parts together form an inner chamber that accommodates a compression spring, a guide bushing for the spring and a spherical body that together form a check valve for hydraulic pressure.

5. The apparatus as recited in claim 1, wherein the hydraulic cylinder obtains working pressure from an oil pump of an internal combustion engine.

6. The apparatus as recited in claim 1, wherein said at least one adjustment means is constituted by a biasing mechanism acting between two of said gear rims solely utilizing abutting engagement with said gear rims, the biasing mechanism being operable to reduce backlash in the gear wheel and having a longitudinal axis oriented transversely to a plane containing at least one of the gear rims.

7. The apparatus as recited in claim 1, wherein said part-spherical head portion in a bowl-shaped seat is constituted by a ball-in-socket arrangement.

8. The apparatus as recited in claim 1, wherein said part-spherical foot portion in a bowl-shaped seat is constituted by a ball-in-socket arrangement.

9. The apparatus as recited in claim 1, wherein the hydraulic cylinder further comprises two telescopically arranged sleeve parts defining an interior chamber fluidly connected to a pressure supply source.

10. The apparatus as recited in claim 9, wherein the pressure supply source is an oil pump of an internal combustion engine.

11. The apparatus as recited in claim 9, further comprising:
   a compression spring, a guide bushing for the compression spring and a spherical body are housed in the interior chamber and together form a check valve for controlling hydraulic pressure.

12. The apparatus as recited in claim 1, wherein said at least one adjusting means is constituted by at least two biasing mechanisms, each acting between two of said gear rims solely utilizing abutting engagement with said gear rims and radially spaced equidistantly about the common axis of rotation, the biasing mechanisms being operable to reduce backlash in the gear wheel and each having a longitudinal axis oriented transversely to a plane containing at least one of the gear rims.

13. The apparatus as recited in claim 12, wherein the at least two biasing mechanisms further comprise at least four biasing mechanisms radially spaced equidistantly about the common axis of rotation.

14. The apparatus as recited in claim 1, wherein said at least one adjustment means is constituted by at least two biasing mechanisms, each interconnected between two of said gear rims and radially spaced equidistantly about the common axis of rotation, the biasing mechanisms being operable to reduce backlash in the gear wheel and each having a longitudinal axis oriented transversely to the gear rims and wherein each biasing mechanism is pivotally interconnected to at least one gear rim by a ball-in-socket arrangement.

15. The apparatus as recited in claim 14, wherein each biasing mechanism further comprises a part-spherical foot portion receivably supported in a bowl-shaped seat formed as recess in one of the gear rims.

16. The apparatus as recited in claim 14 wherein each biasing mechanism further comprises a part-spherical head receivably supported in a bowl-shaped seat formed as recess in one of the gear rims.

* * * * *